US005340870A

United States Patent [19]

Clinnin et al.

[11] Patent Number: 5,340,870
[45] Date of Patent: Aug. 23, 1994

[54] FAST DRY WATERBORNE TRAFFIC MARKING PAINT

[75] Inventors: David D. Clinnin, Schaumburg, Ill.; William G. Heiber, Salem, Oreg.; Ronald J. Lewarchik, Sleepy Hollow, Ill.

[73] Assignee: Morton International, Inc., Chicago, Ill.

[21] Appl. No.: 18,986

[22] Filed: Feb. 18, 1993

Related U.S. Application Data

[63] Continuation of Ser. No. 899,191, Jun. 16, 1992, abandoned, which is a continuation-in-part of Ser. No. 725,153, Jun. 28, 1991, abandoned.

[51] Int. Cl.$^5$ ............................................. C08L 33/00
[52] U.S. Cl. ...................................... 524/522; 524/425; 523/172
[58] Field of Search ................. 524/522, 425; 523/172

[56] References Cited

U.S. PATENT DOCUMENTS

| | | | |
|---|---|---|---|
| 4,277,385 | 7/1981 | Carroll et al. | 260/29.6 RW |
| 4,839,198 | 6/1989 | Lonis et al. | 427/137 |
| 4,973,621 | 11/1990 | Buter | 524/460 |
| 5,073,585 | 12/1991 | Neubert | 524/139 |

*Primary Examiner*—Edward Cain
*Attorney, Agent, or Firm*—Wayne E. Nacker; Gerald K. White

[57] ABSTRACT

A waterborne paint for traffic marking contains as an emulsion binder, a support polymer formed of styrene and acrylic acid monomers and having an acid value of between about 50 and about 250 and a hydrophobic emulsion polymer comprised of acrylic ester monomers and optionally including styrene monomers. The support polymer, in aqueous ammonia solution, acts as a surfactant, maintaining the emulsion polymer within micelles. Paints in accordance with the invention contain between about 10 and about 15 wt. percent of the emulsion polymer, between about 60 and about 75 wt. percent fillers or pigments and between about 9 and about 18 wt. percent water. Due to the high solids loading and low water content, the waterborne traffic marking paint is fast drying. Colored paints prefereably utilize banded pigments.

39 Claims, No Drawings

FAST DRY WATERBORNE TRAFFIC MARKING PAINT

This is a continuation of co-pending application Ser. No. 07/899,191 filed on 16 Jun. 1992, now abandoned which is a Continuation-In Part of Application Ser. No. 07/725,153 filed 28 Jun. 1991, now abandoned.

The present invention is directed to traffic marking paint compositions and particularly to waterborne traffic marking paints having rapid dry times.

BACKGROUND OF THE INVENTION

General requirements of traffic marking paints are that they be rapid drying so as not to be smeared immediately after application. At the same time, the paint should be hard and durable. Conventionally, paints used to mark highways or the like have been solvent-based. In view of the need to reduce volatile organic emissions into the general environment, there is a need to provide waterborne traffic marking paints which perform as well as previously used solvent-based paints.

There has been some evaluations of waterborne traffic marking paints. For example, Rohm and Haas has tested a traffic paint under the experimental designation E-2706. The binder in this paint is believed to be an emulsion polymer comprised of monomers of methyl methacrylate, butyl methacrylate, butyl acrylate and styrene.

Problems that have been experienced with various waterborne traffic marking paint formulations are slow dry times and relatively poor durability, particularly when such formulations have been applied under humid condition. There exists a need for waterborne traffic marking paints with rapid dry times and good durability.

SUMMARY OF THE INVENTION

In accordance with the present invention there is provided a waterborne traffic marking paint with very high pigment levels and with very rapid drying times. The paint dries to a very hard, moisture resistant finish which provides excellent durability, even when applied under relatively humid conditions. The traffic marking paint of the present invention uses a binder that is an emulsion comprising a support polymer which acts as a surfactant so as to enable micelle formation in an aqueous medium and an emulsion polymerized polymer which is maintained within micelles in a water-borne composition. The support polymer is comprised of styrene and acrylic acid monomers and is rendered water-soluble by salt formation with ammonia. The emulsion polymer is comprised of acrylic monomers or acrylic and styrene monomers. The paint compositions comprise between about 10 and about 15 wt. percent binder and between about 60 and about 75 wt. percent fillers and/or pigments.

DETAILED DESCRIPTION OF CERTAIN PREFERRED EMBODIMENTS

The waterborne paints of the present invention have very rapid dry times, very high solids content including a very high pigment volume concentration (pvc), and water vapor impermeability and hardness in the applied and dried paints which contribute to long-term durability. The key to obtaining excellent characteristics appears to lie primarily in the selection of the emulsion binder with appropriate characteristics. It is to be appreciated that traffic marking paints will, at some time or other, be subjected to substantial exposure to water. It is therefore a challenge to provide a water-borne formulation in which the binder must have water compatibility, yet nevertheless, the applied and dried paint must withstand exposure to water over a reasonable life. It has been found that a suitable binder is an emulsion formed of a water-solubilized support polymer and a hydrophobic emulsion polymerized polymer.

The support polymer is formed from styrene or substituted styrene monomers and acrylic acid or substituted acrylic acid monomers. The monomers are selected in such proportion that the support polymer has carboxylic acid functionality so as to provide acid values in about the 50 to 250 range. As a result of the acid functionality, the support polymers may be rendered water-soluble through salt formation with an appropriate base, such as ammonia. While the acid value must be sufficient to provide water solubility to the support polymer and enable the support polymer to act as a surfactant to the emulsion polymerized polymer; with the intent of providing a durable traffic paint, it is desirable that the acid number as low as possible, consistent with the requirements of water-compatibility. This is because common substrates, such as concrete, typically contain basic groups which may tend to resolubilize the support polymer.

The monomers selected for the support polymer are also selected to provide a hard support polymer. As the support polymer comprises a substantial portion of the polymeric binder, i.e., between about 20 and about 40 wt. percent, it is necessary that the support polymer provide some of the hardness required of the binder polymer which promotes durability of the traffic marking paint. The styrene or substituted styrene monomers contribute to hardness of the support polymer. The acrylic acid monomers are also selected to be consistent with polymer hardness, and to this end, acrylic acid, or acrylic acids with short chain substituent groups, e.g., methacrylic acid or ethacrylic acid, are preferably used. One support polymer which has been found to be particularly suitable is a terpolymer of styrene, alpha-methyl styrene and acrylic acid, with the monomers used in about a 1:1:1 molar ratio. Similar polymers with an even lower acrylic acid content, but still consistent with water-compatibility requirements might prove even more suitable.

The weight average molecular weight of the support polymer is in the range of about 2000 to about 10,000. In some cases, the support polymer may have a bimodal or multimodal molecular weight distribution. Adjustments in the molecular weight distribution may be made to vary the $T_g$ of the support polymer.

The support polymer may be manufactured by conventional solution polymerization in an organic solvent, the solvent removed, and the polymer solubilized in water through the aid of ammonia or a volatile amine. Examples of syntheses of suitable support polymers are found, for example, in U.S. Pat. Nos. 4,414,370 and 4,529,787, the teachings of which are incorporated herein by reference. It appears to be important that care is taken so as not to esterify any of the acid functionality, particularly with hydrophillic moieties. It is common for solution polymers to be polymerized in a relatively high-boiling glycol ether, such as ethylene glycol monomethyl ether. However, it is found that when solution polymers are formed in such solvents, the polymers are much less effective support polymers with respect to water resistance of the applied and dried traffic marking paint. It appears that some glycol ether esterifies with the carboxylic groups of the polymer, resulting in a binder that is much less resistant to water in the applied and dried paint. Instead, it is preferred that the support polymers be synthesized in an alcohol, such as ethanol or methanol. This, of course, makes synthesis somewhat more difficult as it is more difficult to achieve desirably high reaction temperatures with such lower-boiling solvents.

The solution polymer, dissolved in an aqueous ammonia media, provides a support for forming an emulsion of the polymer that is polymerized in situ, acting as a surfactant for the emulsion polymer, whereby micelles may be formed. Such a technique is taught, for example, in U.S. Pat. Nos. 4,009,138, 4,151,143 and 4,820,762, the teachings of which are incorporated herein by reference. To the solution are charged monomers in an appropriate ratio along with an initiator, such as ammonium persulfate.

The monomers used to form the emulsion polymers are selected so as to form a relatively hard polymer. Also, the monomers must form a polymer sufficiently hydrophobic so as to form micelles, rather than be soluble in alkaline aqueous solution. The monomers may be all acrylic monomers or may be a mixture of acrylic and styrene monomers. The acrylic monomers are substantially all esterified so that the polymer has little or no carboxylic functionality, although a minor portion of the monomer content may be an acrylic acid. The acid number of the emulsion polymer should be below about 15. Preferably, the emulsion polymer has a glass transition temperature ($T_g$) between about $-15°$ C. and about $15°$ C. Sufficient monomer is polymerized such that the emulsion polymer comprises between about 60 and about 80 wt. percent of the total amount of binder polymer.

In accordance with a preferred aspect of the invention, between about 20 and about 80 mole percent of the emulsion polymer is an ester of an acrylic acid and an alcohol having at least about 8 carbon atoms. Examples of such monomers include 2-ethyl-1-hexyl methacrylate, stearyl methacrylate and laural methacrylate. These monomers impart good adhesion, good wetting of the pigment and good water resistance in the applied and dried paint. On the other hand, to provide the necessary hardness to the paint, another substantial portion, e.g., between about 20 and about 80 mole percent is an ester of an acrylic acid and a short-chain alcohol having about 4 carbon atoms or fewer. Examples of these monomers include butyl acrylate, butyl methacrylate, ethyl methacrylate, ethyl acrylate, methyl methacrylate and methyl acrylate. One particularly suitable emulsion polymer is a copolymer of 2-ethyl-1-hexyl methacrylate and methyl methacrylate in about equal molar amounts.

The polymerization is carried out so as to produce micelles of relatively small size, preferably so that the major portion of the micelles are in the range of 0.1–0.2 microns. The small size of the micelles is believed to be important in promoting wetting of pigment and filler particles and in promoting cohesion of the binder micelles during drying.

For water resistance of the applied and dried paint formulation, it appears to be important that the emulsion polymerization be carried out without the presence of additional surfactants, other than the support polymer. It is not unknown to carry out such a polymerization without the addition of more conventional surfactants; however, it is common to use some additional surfactants, because this simplifies the emulsion polymerization. When polymerizing without added surfactant, care must be taken to avoid the production of oversize micelles which are less suitable as binders and which may tend to settle out of solution. To this end, monomer addition is effected over a period of time, and the monomer feed is initially very slow until an exotherm is observed, indicating initiation of polymerization. As the monomers react to form the emulsion polymer which, generally lacking hydrophillic moieties, is quite hydrophobic, the newly formed polymer becomes emulsified by the support polymer, thereby forming micelles.

It seem somewhat surprising that it makes a difference whether the emulsion polymerization is carried out within or without the presence of additional surfactants, but substantially better water resistance in the applied and dried paint is exhibited when the emulsion polymerization has been carried out in the absence of additional surfactants. It is understandable that surfactants in a paint formulation might provide a vehicle for water attack. However, as will be discussed hereinafter, surfactants or dispersants are used in the paint formulations of the present invention to disperse the pigment in the aqueous medium. Why then it should make a difference whether the emulsion polymerization is conducted with or without surfactant is not fully understood.

Through selection of a binder polymer which exhibits excellent wetting of fillers and pigments, a small amount of binder polymer is used to bind a high level of filler and/or pigment solids. In fact, whereas the total amount of binder polymer in the paint formulations of the present invention is lower than that of other waterborne traffic marking paint formulations, i.e., between about 10 and about 15 wt. percent of the total paint formulation (including solids, water and other volatiles), the total levels of pigments are quite high, i.e., between about 60 and about 75 wt. percent of the total paint formulations, preferably between about 68 and 75 wt. percent. Pigment volume concentrations upward of 70% are achieved using the emulsion binder polymers selected for use in the present invention.

One of the factors contributing to rapid dry time is the excellent coalescing properties of the binder polymers. Another factor contributing to rapid drying is the fact that with the high solids loading achievable by the paint formulations of the present invention, i.e., to between about 75 and about 90 wt. percent of the total paint formulation, preferably upward of about 80 wt. percent, the total level of water used in the present invention is quite low relative to other waterborne traffic marking paint formulations, i.e., between about 9 and about 18 wt. percent relative to the total paint formulation. The low level of water in the paint formulation means that substantially less water need be evaporated to achieve dryness. Paint formulations in accordance with the present invention have achieved ASTM D-711 "no pick-up" times of 2 min. at ambient temperatures and "no pick-up" dry times of 30 sec. when applied by hot spray at 120° F. (49° C.).

Although the paint formulations of the present invention are "waterborne", they can, and preferably do, contain a small amount of organic solvent. The solvent acts to reduce the viscosity of the paint formulation. A preferred solvent is methanol, which also forms an azeotrope with water and thereby promotes evaporation of water from the applied paint formulation. Other waterborne paint formulations have also contained some organic solvents. Significantly, paint formulations of the present invention contain relatively low levels of the organic solvent, i.e., between about 3 and about 6 wt. percent relative to the total paint formulation The major filler in the paint formulation of the present invention is calcium carbonate. This pigment is preferred because of its low oil absorption, whereby a relatively small amount of binder is required to wet the pigment. Between about 70 and about 90 wt. percent of total pigment is calcium carbonate. Because calcium carbonate has little or no light refracting ability, it is considered to be an extender pigment or a filler. For whiteness or opacity, an opaque pigment, e.g., $TiO_2$ is added, typically at a level of between about 10 and about 30 wt. percent of total pigment. $TiO_2$ will provide a white color to white marking paints. If other colors are desired, other pigments are added, often organic pigments of specific color. Such additional pigments are typically used between about 3 and about 10 wt. percent of total pigments.

When organic pigments or other finely divided pigments are used to color the paints in accordance with the present invention, it is preferred that the pigments be "banded"; that is, predispersed in a dispersing polymer. The banded pigment is a solid blend of the pigment in the dispersing polymer. Pigments which are desirably banded include inorganic pigments, such as iron oxide and carbon black, and organic pigments such as 75 type yellow, e.g., DCC-1111 sold by Dominium Colour, Inc. and 1249 sold by Englehard; copper phthalocyanine (Zulu Blue NCNF-4863) sold by Englehard, and DCC-2254 red--medium toluidine, sold by Dominium. Banded pigments are particularly compatible with paints of the present invention because generally the same polymers suitable as support polymers in the emulsion binder are suitable as dispersing polymers, and herein, the definition of the support polymer above serves as a definition of suitable dispersing polymer. The dispersing polymer, by virtue of its acid functionality, is soluble in alkaline aqueous media.

Banded pigments are produced by melt-processing the pigment with the dispersing polymer. A currently preferred method of producing banded pigments useful in the present invention is to process dispersing polymer and colored pigment in a two-roll mill. Sufficient heat is generated to melt the thermoplastic dispersing polymer into a viscous material which wets and encapsulates the pigment particles. The two-roll milling further helps to break up clumps of the pigment particles, ensuring their dispersion within the dispersing polymer. When the banded pigments are subsequently introduced into alkaline aqueous media, e.g., the paints of the present invention, the dispersing polypher dissolves in the media, retaining the pigment particles encapsulated in dispersing polymer.

Banded pigments generally comprise between about 20 and about 60 wt. percent pigment, balance dispersing polymer. High weight percent of pigment is generally considered to be desirable.

Using banded pigments avoids recognized problems in trying to disperse fine pigment particles in water-borne paints. If finely divided pigment is introduced into a paint, the paint must be subject to high shear forces, e.g., in a sand mill, to disperse the pigment. Such high shear tends to break down emulsions, such as the binder of the present invention. Furthermore, high shear processing is detrimental to many organic pigments, such as light-fast organic yellow pigments often used in traffic marking paints. Use of banded pigments eliminates the need for high shear mixing to disperse the pigment particles because the pigment particles become dispersed in the alkaline aqueous medium as the dispersing polymer of the banded pigment dissolves. Because banded pigments are solids, they introduce no additional water into the paint, as would a separately-prepared aqueous pigment dispersion. Keeping in mind that high solids content is sought in order to achieve solids content, particularly in a traffic marking paint, banded pigments are very useful in producing a high solids paint.

A further advantage of using banded pigments is that they contribute to high gloss of the finish. It is believed that this may be attributed to the excellent dispersion of the pigment particles in the paint. The fact that each pigment particle is encapsulated in polymer may also contribute to gloss. Certain traffic marking applications, particularly curb painting, often require medium to high-gloss paints.

When adding banded pigment to paint, dispersions are most quickly obtained when the pH is relatively high, e.g., above about 8.4. In traffic marking paints, the pH is preferably raised with ammonia.

In colored compositions formed from banded pigments, the emulsion binder comprises between about 10 and about 15 wt. percent of the paint, colorless and/or white pigments and/or fillers comprise between about 53 and about 75 wt. percent of the paint, colored pigments comprise between about 0.2 and about 7 wt percent of the paint, suspension polymer in which the colored pigments are encapsulated comprise between about 0.2 and about 15 wt. percent of the paint, water comprises between about 9 and about 18 wt. percent of the paint, and sufficient ammonia is present to maintain an emulsion of the binder and a dispersion of colored pigment in suspension polymer. The total amount of banded pigment components, i.e., colored pigment plus dispersing polymer, is between about 0.5 and about 22 wt. percent of the paint.

To promote and maintain dispersion of the filler and pigment particles, dispersants or surfactants are used. Preferably, a mixture of anionic and non-ionic surfactants are used. Surfactants or dispersants are typically used at between about 0.5 and about 2 wt. percent of the paint formulation.

The formulation may also contain additional components as are known in the art, such as defoamers and coalescing agents.

The paints are prepared by mixing of the ingredients. Generally, all of the ingredients except the organic solvent (e.g., methanol) and minor portions of additives are mixed together and then the methanol and remainder of the additives are used to thin down the paint.

Paints prepared in accordance with the invention have proven to be stable during application up to 190° F. (88° C.). Generally, for hot spray application, stability up to 160° F. (71° C.) is sufficient.

Paint compositions according to the invention may be applied to any usual roadway paving material, including asphalt and concrete. While the paints are particularly formulated for roadway marking, they can be used for other applications, particularly for other applications where similar paint properties are required or desirable.

The invention will now be described in greater detail by way of specific examples.

EXAMPLE 1

A white paint formulation was prepared containing the following components:

| Material | Volume | Weight |
| --- | --- | --- |
| Carboset XPD-1324 Emulsion acrylic polymer (B. F. Goodrich) | 30.22 | 336.57 |
| W-22 anionic/non-ionic dispersant mixture (Daniel Products Co.) | 1.56 | 13.74 |
| Tamol-960 anionic surfactant | 0.72 | 7.63 |
| Drew-493, defoamer (Ashland Chemical) | 0.29 | 2.18 |
| Methanol | 8.00 | 52.79 |
| $TiO_2$ (RCL-9) | 2.40 | 82.24 |
| Calcium Carbonate, Snowflake P.E. ECC America, Inc. | 42.04 | 948.9 |
| Dowanol DB, coalescent Eastman Chemical Products, Inc. | 1.11 | 8.83 |
| Methanol | 5.35 | 35.34 |
| Drew-493 | 0.29 | 2.18 |

All ingredients above the line were thoroughly mixed. Then the last three ingredients were added to thin the paint. The emulsion polymer had a non-volatile solids content of 49% (49% NVM). The paint formulations has an NVM of 81%, or 64% non-volatile percent by volume.

EXAMPLE 2

A yellow road marking paint having the following formula:

| Material | Weight |
| --- | --- |
| Carboset XPD-1324 | 336.3 |
| Sokalan CP-10, dispersant (BASF Corp.) | 12.0 |
| Drew L-493 | 2.2 |
| RCL-9 $TiO_2$ | 9.6 |
| Hi-Tox $TiO_2$ | 9.9 |
| Hansa 11-2400, organic yellow pigment | 38.4 |
| Calcium carbonate, Snowflake. P.E. | 948.9 |
| Methanol | 52.7 |
| Dowanol DB | 8.8 |
| Methanol | 35.3 |
| Drew L-493 | 2.2 |

*Monomer content analyzed: 2-ethylhexyl acrylate 50 molar percent, methyl methacrylate 30 molar percent, styrene 10 molar percent, alpha-methyl styrene 10 molar percent.
Again, all ingredients above the line were mixed until the pigment was fully incorporated. Then the last three ingredients were added to thin the paint.

EXAMPLE 3

The paint of Example 1 and a waterborne paint of Rohm and Haas (E-2706) were each applied to glass. Properties of the dried paints are given below.

| Test | R & H | Ex. 1 |
| --- | --- | --- |
| Falling Sand Taber (mg/cycle) | 0.58 | 0.49 |
| Water Immersion (minutes to tape-off) | 10 | 40 |
| Pendulum Hardness | 38 | 93 |
| Freeze Cycle Tape X-Hatch | 0% Pass | 50% Pass |
| Freeze/Thaw No. of cycles | 5 | 5 |

In the tests, a paint formulated in accordance with the present invention performed substantially better than than the Rohm & Haas formulation. Most notable is the substantially greater hardness of the paint of the present invention.

EXAMPLE 4

Binder emulsions produced in accordance with the present invention were produced as follows. In preparations A, B and C the starting materials were each commercial solutions of styrene/alpha-methyl styrene/acrylic copolymer in about a 1:1:1 molar ratio and a molecular weight of approximately 6000 to 9000. In preparation A, the solution was Morcryl®, a 32% solution of Morez®-101 sold by Morton International, Inc. In preparations B and C, the solution was B.F. Goodrich's XPD-1166. Each preparation was formulated to provide approximately a 50 wt. % final solids composition. The components for preparations A, B, and C expressed as weight percent were as follows with methyl methacrylate (MMA) and 2-ethyl-1-hexyl acrylate (EHA) comprising the emulsion polymer.

|  | A | B | C |
| --- | --- | --- | --- |
| Support resin | 12.2 | 12.2 | 11.5 |
| Ammonium persulfate | 0.54 | 0.47 | 0.47 |
| MMA | 18.6 | 19.42 | 22.4 |
| EHA | 18.6 | 17.0 | 14.05 |
| Ammonia | 0.4 | 0.4 | 0.4 |
| Water | Balance | Balance | Balance |

The solution was heated to between 75° and 85° C. and the monomer mixture was added over a 2-2 ½ hr. period, after which heating was continued for an additional 30 min. No additional surfactant of any kind was used to prepare the polymers.

EXAMPLE 5

Paint formulations were prepared using the synthesized polymers of Example 4 (A, B and C), and emulsion polymer sold by ICI as ICI A-1052 (formulation 2). Properties of the paint of Example 1 (formulation A) and similar formulations but with the different binders (formulations 2, A, B, and C) are given in the table below.

| | RESIN PROPERTIES | | | | |
| --- | --- | --- | --- | --- | --- |
| | 1 | 2 | A | B | C |
| NVM | 49.0% | 49.0% | 49.2% | 49.0% | 49.0% |
| Viscostity (cps) | 650 | 200 | 400 | 330 | 328 |
| pH | 8.8 | 8.5 | 8.4 | 8.5 | 8.1 |
| AV/NV | 50 | 50 | 60.9 | 50* | 50* |
| WPG | 8.8 | — | 8.72 | — | — |
| Tg, °C. | 1-5 | — | 0.3* | 5* | −15* |
| Solvents | Ammonia | Ammonia | Ammonia DPM | Ammonia | Ammonia |
| Surfactants | None | Anionic and Nonionic | None | None | None |

*Denotes theoretical values.

| | PAINT PROPERTIES | | | | |
| --- | --- | --- | --- | --- | --- |
| | 1 | 2 | A | B | C |
| Viscosity (KU) | 104 | 120 | 108 | 114 | 108 |
| Dry Time D711 | <2 Min. | <2 Min. | <2 Min. | <2 Min. | <2 Min. |
| $H_2O$ Immersion | 50 Min. | <10 Min. | <25 Min. | <35 Min. | <50 Min. |
| Pendulem Hardness | 92 | 71 | 71 | 72 | 41 |

EXAMPLE 6

Traffic marking paints in accordance with the present invention were compared with a solvent based traffic marking paint and other waterborne traffic marking paints on an asphalt roadway in Salem, Oregon. The marking paints were applied at 77° F., 20% relative humidity, 65 degree road temperature and with a slight breeze. The paints were as follows:

1. A solvent-based paint sold by Morton International under Idaho specifications and called "Instant Dry"; the binders are ethylene vinyl acetate and chlorinated polyolefin in a hydrocarbon solvent.
2. The formulation of Example 1.
3 and 4. The formulation of Example 1, but using varying amounts of Duramite (a calcium carbonate) to replace some of the Snow Flake calcium carbonate.
5. A modification of Example 1 formulation using Duramite plus extendospheres SL-150 (hollow glass spheres) as filler.
6. A modification of Example 1 formulation using Duramite and Omyacarb U.F., another calcium carbonate.
7. A modification of Example 1 formulation using Duramite and Omyacarb U.F. fillers and replacing part of the Goodrich XPD-1324 resin with Resin B, as per Example 4.
8. Pervo acrylic fast dry, a waterborne traffic marking paint.
9. Rohm & Haas E2708 JG1040-1 formula, a waterborne traffic marking paint.
10. Waterborne Tech, Night Cool (yellow) a waterborne traffic marking paint.

Paint formulations 2–7 had "no pick-up" times of 30 to 60 sec. Formulations 8–10 had "no pick-up" times of 90–120 sec.

Rapid degradation of films produced from formulations 8–10 was observed within several days, with no evidence of any wear in the films produced by formulations 2–7. By 12 days after application, massive erosion of the films to total failure of formulations 8 and 10 and 50% failure of formulation 9 was observed, while formulations 2–7 continued to show no wear. Water resistance was believed to be the discerning factor for the wearing properties of formulations 2–7. During the initial 12 day observation period, temperatures varied from 65° to 80° F.; rainfall was 2+inches; average traffic was about 20,000 cars per day.

At the end of about 7 ½ weeks, all of formulations 2–7 exhibited equal or better wear compared to formulation 1, with formulation 4 exhibiting the best wear characteristics in this test.

EXAMPLE 7

Set forth below are resin supported emulsion polymers considered useful, if not necessarily preferred, for forming paints in accordance with the present invention. Components are expressed as percent by weight. MOREZ® is as defined previously, MMA =methyl methacrylate; MAA =methacrylic acid; EA =ethyl acrylate; BA =butyl acrylate; and EHA=2-ethyl-1-hexyl acrylate. MOREZ® is the support polymer and the emulsion polymer is comprised of the monomers listed. In each case, the polymer is neutralized with ammonia. Binders D–H are commercial products which are currently prepared in DOWANOL® (ethylene glycol monomethyl ether), a manner of preparation not preferred in accordance with this invention. Binders I–L are theoretical binders; the properties listed for these properties are likewise theoretical.

|  | D | E | F | G | H | I | J | K | L |
|---|---|---|---|---|---|---|---|---|---|
| MOREZ® | 12 | 15 | 12 | 25 | 12 | 12 | 12 | 12 | 12 |
| MMA | 6 | 2 | 2 | — | 10 | 19 | 10 | — | 10 |
| MAA | — | — | 1 | — | — | — | — | — | — |
| EA | — | — | 2 | — | — | — | 15 | — | — |
| BA | — | — | 13 | 10 | 20 | 19 | — | 15 | 20 |
| STYRENE | 12 | 30 | 15 | 10 | — | — | — | — | — |
| EHA | 20 | — | — | — | 11 | — | 13 | 8 | — |
| Balance, aqueous solution | | | | | | | | | |

| RESIN PROPERTIES | | | | | | | | | |
|---|---|---|---|---|---|---|---|---|---|
|  | D | E | F | G | H | I | J | K | L |
| NVM | 50 | 47 | 45 | 53 | 50 | 50 | 50 | 50 | 50 |
| VISCOSITY | 1500 | 1000 | 1000 | 1500 | 1500 | 1000 | 1200 | 1000 | 1500 |
| pH | 8.0 | 8.3 | 8.5 | 8.8 | 8.3 | 8.6 | 8.3 | 8.5 | 8.5 |
| AV/NVM | 50 | 55 | 45 | 105 | 50 | 50 | 50 | 50 | 50 |
| $T_g$, °C. | −8 | 103 | −40 | 45 | −20 | 25 | 9 | 16 | 4 |
| Wt/gal | 8.70 | 8.70 | 8.60 | 8.80 | 8.60 | 8.60 | 8.70 | 8.70 | 8.60 |

Compositions and properties of additional paint formulations in accordance with the invention and prepared as in accordance with Example 1 are set forth in Examples 8 through 13

| MATERIAL | VOLUME | WEIGHT |
|---|---|---|
| Lucidine ® 603* | 40.00 | 352.00 |
| Nopco 44** | 0.50 | 3.90 |
| Triton CF 10 | 0.25 | 2.20 |
| Drew 1-493 | 0.27 | 2.00 |
| Methanol 95 | 6.41 | 42.31 |
| RCL-9 TiO2 | 2.34 | 80.00 |
| Snowflake P.E. | 40.92 | 923.63 |
| Methanol 95 | 9.00 | 59.40 |
| Drew L-493 | 0.27 | 2.00 |
| Nuosept 95*** | 0.21 | 2.00 |

*Morton International Graphic Arts Product, Tg 11° C., MOREZ ® support resin; emulsion polymer a copolymer of methyl methacrylate and butyl acrylate.
**Wetting agent/dispersant
***Biocide

| PROPERTIES | | | | |
|---|---|---|---|---|
|  | WEIGHT | VOLUME | | |
| Formula Size | 1469.431 | 100.165 | Density | 14.67 |
|  |  |  | Spec Gravity | 1.76 |
| Tot. Vehicle | 31.70% | 56.81% | P.V.C. | 69.85% |
| Pigment | 68.30% | 43.19% | P/B Ratio | 5.751 |
| Volatile | 19.83% | 38.16% | Spread@1 Mil | 992 $F^2$ |
| Org. Solvent | 7.26% | 15.90% | CPSFA@1 Mil | 0.0020/$F^2$ |
| Non-Volatile | 80.17% | 61.84% | Coating VOC | 164 G/L |
| Non-Vol Veh | 11.87% | 18.65% | Mat'l VOC | 128 G/L |

EXAMPLE 9

| MATERIAL | VOLUME | WEIGHT |
|---|---|---|
| Lucidine ® 603 | 40.00 | 352.00 |
| Surfynol TG* | 0.36 | 3.00 |
| Drew 1-493 | 0.27 | 2.00 |
| Methanol 95 | 6.41 | 42.31 |
| RCL-9 TiO2 | 2.92 | 100.00 |
| Snowflake P.E. | 40.92 | 923.63 |

11

-continued

| MATERIAL | VOLUME | WEIGHT |
|---|---|---|
| Methanol 95 | 9.00 | 59.40 |
| Drew L-493 | 0.27 | 2.00 |
| Nuosept 95 | 0.21 | 2.00 |

*Wetting agent/dispersant

| | PROPERTIES | | | |
|---|---|---|---|---|
| | WEIGHT | VOL-UME | | |
| Formula Size | 1486.331 | 100.360 | Density | 14.81 |
| | | | Spec Gravity | 1.76 |
| Tot. Vehicle | 31.13% | 56.31% | P.V.C. | 70.13% |
| Pigment | 68.87% | 43.69% | P/B Ratio | 5.867 |
| Volatile | 19.39% | 37.70% | Spread@1 Mil | 999 F$^2$ |
| Org. Solvent | 6.97% | 15.48% | CPSFA@1 Mil | 0.0022/F$^2$ |
| Non-Volatile | 80.61% | 62.30% | Coating VOC | 159 G/L |
| Non-Vol Veh | 11.74% | 18.61% | Mat'l VOC | 124 G/L |

EXAMPLE 10

| MATERIAL | VOLUME | WEIGHT |
|---|---|---|
| Lucidine ® 603 | 41.41 | 364.41 |
| Surfynol 104E* | 0.36 | 3.00 |
| Drew 1-493 | 0.27 | 2.00 |
| Methanol 95 | 5.00 | 33.00 |
| RCL-9 TiO2 | 2.92 | 100.00 |
| Snowflake P.E. | 40.92 | 923.63 |
| Methanol 95 | 9.00 | 59.40 |
| Drew L-493 | 0.27 | 2.00 |
| Nuosept 95 | 0.21 | 2.00 |

*Wetting agent/dispersant

| | PROPERTIES | | | |
|---|---|---|---|---|
| | WEIGHT | VOL-UME | | |
| Formula Size | 1489.433 | 100.360 | Density | 14.84 |
| | | | Spec Gravity | 1.78 |
| Tot. Vehicle | 31.27% | 56.31% | P.V.C. | 69.40% |
| Pigment | 68.73% | 43.69% | P/B Ratio | 5.669 |
| Volatile | 19.15% | 37.05% | Spread@1 Mil | 1010 F$^2$ |
| Org. Solvent | 6.36% | 14.14% | CPSFA@1 Mil | 0.0021/F$^2$ |
| Non-Volatile | 80.85% | 62.95% | Coating VOC | 147 G/L |
| Non-Vol Veh | 12.12% | 19.22% | Mat'l VOC | 113 G/L |

EXAMPLE 11

| MATERIAL | VOLUME | WEIGHT |
|---|---|---|
| Lucidine ® 603 | 41.41 | 364.41 |
| Surfynol 104E* | 0.36 | 3.00 |
| L-475 | 0.26 | 2.00 |
| Methanol 95 | 5.00 | 33.00 |
| RCL-9 TiO2 | 2.92 | 100.00 |
| Duramite* | 41.05 | 923.63 |
| Methanol 95 | 9.00 | 59.40 |
| L-475 | 0.26 | 2.00 |
| Nuosept 95 | 0.21 | 2.00 |

*Calcium carbonate

| | PROPERTIES | | | |
|---|---|---|---|---|
| | WEIGHT | VOL-UME | | |
| Formula Size | 1489.433 | 100.481 | Density | 14.82 |
| | | | Spec Gravity | 1.78 |
| Tot. Vehicle | 31.27% | 56.24% | P.V.C. | 69.47% |

12

-continued

| | PROPERTIES | | | |
|---|---|---|---|---|
| | WEIGHT | VOL-UME | | |
| Pigment | 68.73% | 43.76% | P/B Ratio | 5.669 |
| Volatile | 19.15% | 37.00% | Spread@1 Mil | 1011 F$^2$ |
| Org. Solvent | 6.36% | 14.12% | CPSFA@1 Mil | 0.0032/F$^2$ |
| Non-Volatile | 80.85% | 63.00% | Coating VOC | 147 G/L |
| Non-Vol Veh | 12.12% | 19.24% | Mat'l VOC | 113 G/L |

EXAMPLE 12

| MATERIAL | VOLUME | WEIGHT |
|---|---|---|
| Lucidine ® 603 | 38.00 | 334.40 |
| Surfynol 104E* | 0.36 | 3.00 |
| L-475 | 0.26 | 2.00 |
| Methanol 95 | 5.00 | 33.00 |
| RCL-9 TiO2 | 2.92 | 100.00 |
| Siliicostil 40* | 6.82 | 150.00 |
| Duramite | 37.64 | 847.00 |
| Methanol 95 | 9.00 | 59.40 |
| L-475 | 0.26 | 2.00 |
| Nuosept 95 | 0.21 | 2.00 |

*Silica

| | PROPERTIES | | | |
|---|---|---|---|---|
| | WEIGHT | VOL-UME | | |
| Formula Size | 1532.800 | 100.483 | Density | 15.25 |
| | | | Spec Gravity | 1.83 |
| Tot. Vehicle | 28.43% | 52.84% | P.V.C. | 72.74% |
| Pigment | 71.57% | 47.16% | P/B Ratio | 6.614 |
| Volatile | 17.61% | 35.17% | Spread@1 Mil | 1040 F$^2$ |
| Org. Solvent | 6.18% | 14.12% | CPSFA@1 Mil | 0.0031/F$^2$ |
| Non-Volatile | 82.39% | 64.83% | Coating VOC | 143 G/L |
| Non-Vol Veh | 10.82% | 17.67% | Mat'l VOC | 113 G/L |

EXAMPLE 13

| MATERIAL | VOLUME | WEIGHT |
|---|---|---|
| Lucidine ® 603 | 38.00 | 334.40 |
| Surfynol 104E* | 0.36 | 3.00 |
| L-475 | 0.26 | 2.00 |
| Methanol 95 | 5.00 | 33.00 |
| RCL-9 TiO2 | 2.92 | 100.00 |
| Silicosil 40** | 6.82 | 150.00 |
| Duramite | 37.64 | 847.00 |
| Methanol 95 | 9.00 | 59.40 |
| L-475 | 0.26 | 2.00 |
| Nuosept 95 | 0.21 | 2.00 |

*Wetting agent/dispersant
**Silica

| | PROPERTIES | | | |
|---|---|---|---|---|
| | WEIGHT | VOL-UME | | |
| Formula Size | 1532.800 | 100.483 | Density | 15.25 |
| | | | Spec Gravity | 1.83 |
| Tot. Vehicle | 28.43% | 52.84% | P.V.C. | 72.74% |
| Pigment | 71.57% | 47.16% | P/B Ratio | 6.614 |
| Volatile | 17.61% | 35.17% | Spread@1 Mil | 1040 F$^2$ |
| Org. Solvent | 6.18% | 14.12% | CPSFA@1 Mil | 0.0031/F$^2$ |
| Non-Volatile | 82.39% | 64.83% | Coating VOC | 143 G/L |
| Non-Vol Veh | 10.82% | 17.67% | Mat'l VOC | 113 G/L |

EXAMPLE 14

A yellow paint formulation was prepared containing the following components:

| MATERIAL | VOLUME | WEIGHT |
| --- | --- | --- |
| XPD-1232 | 26.82 | 235.98 |
| Hexyl Carbitol | 0.01 | 0.07 |
| Ethyl Alcohol | 31.77 | 31.77 |
| 100A Disp. W-22 | 1.04 | 9.13 |
| Sokalan CP10* | 0.16 | 1.77 |
| Tamol-960 | 0.55 | 5.80 |
| Drew L-493 | 0.24 | 1.77 |
| RCL-9 TiO$_2$ | 0.45 | 15.43 |
| Snowflake P.E. | 30.08 | 678.79 |
| Ammonia | 0.47 | 3.54 |
| Yellow Chip Dispersion** | 3.58 | 35.10 |
| Methanol | 4.64 | 30.64 |
| Drew L-493 | 0.20 | 1.49 |

*(Anionic dispersant (BASF))
**Banded pigment produced by roll milling 60 wt. % Cookson D-T720 yellow pigment with 40 wt % Morton International MOREZ 101 resin.

All components above the first line were thoroughly blended at high speed. Next, the ammonia was added and blended. In the final step, the yellow chip dispersant, the methanol and final amount of Drew defoamer were blended at low speed.

While the invention has been described in terms of certain preferred embodiments, modifications obvious to one with ordinary skill in the art may be made without departing from the scope of the present invention.

Various features of the invention are set forth in the following claims.

What is claimed is:

1. A method of marking a paved surface comprising applying to said surface a layer of an air-dry waterborne paint comprising
    (1) between about 10 and about 15 wt. percent of an emulsion binder comprising between about 20 and about 40 wt % of a support polymer formed of monomers comprising styrene or substituted styrene or alkyl-substituted styrene and acrylic acid or alkyl-substituted acrylic acid, said support polymer having an acid number of between about 50 and about 250, and an emulsion polymer formed of monomers comprising esters of acrylic acid or alkyl-substituted acrylic acid, optionally styrene or alkyl substituted styrene and optionally an amount of acrylic acid or an alkyl-substituted acrylic acid sufficiently low so that said emulsion polymer is insoluble in alkaline aqueous solution, said support polymer and said emulsion polymer being in the form of micelles with said support polymer acting as a surfactant to maintain said emulsion polymer within said micelles,
    (2) between about 60 and about 75 wt. percent pigments and/or fillers, plus surfactant sufficient to maintain said pigment and/or filler dispersed, and
    (3) between about 9 and about 18 wt. percent water, plus sufficient ammonia to maintain an emulsion of said binder,
said paint having an ASTM D-711 "no pick-up" time of 2 minutes or less at ambient temperatures.

2. A method according to claim 1 where in said paint, substantially none of the carboxylic groups of said support polymers are esterified to hydrophilic moieties.

3. A method according to claim 1 where in said paint, said emulsion polymer was prepared in the substantial absence of surfactant other than said support polymer.

4. A method according to claim 1 wherein said paint further comprises between about 3 and about 6 wt. percent of an organic solvent.

5. A method according to claim 4 where in said paint, said organic solvent is methanol.

6. A method according to claim 1 where in said paint, micelles of said emulsion polymer are pedominantly in the size range of between about 0.1 and about 0.2 microns.

7. A method according to claim 1 wherein said paint contains between about 0.5 and about 2.0 wt. percent of said surfactant.

8. A method according to claim 7 where in said paint, said surfactant comprises a mixture of anioic and nonionic surfactants.

9. A method according to claim 1 where in said paint, said emulsion polymer has a $T_g$ of between about $-15°$ C. and about 15° C.

10. A method according to claim 1 where in said paint, said pigments and/or fillers are at a level of upward of about 68 wt. percent.

11. A method according to claim 1 wherein between about 70 and about 90 wt. percent of said fillers and/or pigment is calcium carbonate.

12. A method of marking a paved surface comprising applying to said surface a layer of an air-dry waterborne paint comprising;
    (1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and an emulsion polymer formed of monomers comprising esters of acrylic acid or alkyl-substituted acrylic acid, said emulsion polymer being formed of between about 20 and about 80 mole percent monomers which are acrylic esters of alcohols having 8 or more carbon atoms and between about 20 and about 80 mole percent of monomers which are acrylic esters of alcohols having 4 of fewer carbon atoms, said support polymer and said emulsion polymer being in the form of micelles with said support polymer acting as a surfactant to maintain said emulsion polymer within said micelles,
    (2) between about 60 and about 75 wt. percent pigments and/or fillers plus surfactant sufficient to maintain said pigment and/or filler dispersed, and
    (3) between about 9 and about 18 wt. percent water, plus sufficient ammonia to maintain an emulsion of said binder,
said paint having an ASTM D-711 "no pick-up" time of 2 minutes or less at ambient temperatures.

13. A method of marking a paved surface comprising applying to said surface a layer of an air-dry waterborne paint comprising
    (1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and about 80 wt. percent of an emulsion polymer formed of monomers comprising esters of acrylic acid or alkyl-substituted acrylic acid, optionally styrene or alkyl-substituted styrene and optionally an amount of acrylic acid or an alkyl-substituted acrylic acid sufficiently low so that said emulsion polymer is insoluble in alkaline aqueous solution, said support polymer and said emulsion polymer being in the form of micelles with said support polymer acting as a surfactant to maintain said emulsion polymer within said micelles, (2) between about 53 and about 75 wt. percent colorless or white inorganic pigments and/or fillers, plus surfactant sufficient to maintain said colorless or white pigment and/or filler dispersed, and (3) between about 1 ½ and about 15 wt. percent of a dispersing polymer formed of monomers comprising styrene or alkyl-substituted styrene and acrylic acid or substituted acrylic acid, said support polymer having an acid number of between about 50 and about 250, (4) between about 0.2 and about 7 wt. percent of colored pigment particles encapsulated by and suspended in said dispersing polymer, the total of (2) plus (4) being t least about 60 wt %, and (5) between about 9 and about 18 wt. percent water, plus sufficient ammonia to maintain an emulsion of said emulsion binder and maintain said dispersing polymer encapsulated pigment particles in suspension, said paint having an ASTM D-711 "no pick-up" time of 2 minutes or less at ambient temperatures.

14. A method of marking a paved surface comprising applying to said surface a layer of an air-dry waterborne paint comprising;

(1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and abut 80 wt. percent of an emulsion polymer formed of monomers comprising esters of acrylic acid or alkyl-substituted acrylic acid, said emulsion polymer being formed of between about 20 and about 80 mole percent monomers which are acrylic esters of alcohols having 8 or more carbon atoms and between about 20 and about 80 mole percent of monomers which are acrylic esters of alcohols having 4 or fewer carbon atoms, said support polymer and said emulsion polymer being in the form of micelles with said support polymer acting as a surfactant to maintain said emulsion polymer within said micelles, (2) between about 53 and about 75 wt. percent colorless or white inorganic pigments and/or fillers plus surfactant sufficient to maintain said colorless or white pigment and/or filler dispersed, and (3) between about 1½ and about 15 wt. percent of a dispersing polymer formed of monomers comprising styrene or substituted styrene and acrylic acid or alkyl-substituted acrylic acid, said support polymer having an acid number of between about 50 and about 250, (4) between about 0.2 and about 7 wt. percent of colored pigment particles encapsulated by and suspended in said dispersing polymer, the total of (2) plus (4) being at least about 60 wt %, and (5) between about 9 and about 18 wt. percent water, plus sufficient ammonia to maintain an emulsion of said emulsion binder, said paint having an ASTM D-711 "no pick-up" time of 2 minutes or less at ambient temperatures.

15. A method of preparing a water-borne, air-dry paint suitable for marking a paved surface comprising mixing (1) an emulsion of a binder in ammonia/aqueous medium, said binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and about 90 wt % of an emulsion polymer formed of monomers comprising esters of acrylic acid or alkyl-substituted styrene and optionally an amount of acrylic acid or an alkyl-substituted acrylic acid sufficiently low so that said emulsion polymer is insoluble in alkaline aqueous solution, said support polymer and said emulsion polymer being in the form of micelles with said support polymer acting as a surfactant to maintain said emulsion polymer within said micelles, (2) between about 53 and about 75 wt % colorless or white pigments and/or fillers, plus surfactant sufficient to maintain said colorless or white pigment and/or fillers dispersed, (3) between about 0.5 and about 22 wt % of banded pigment, between about 20 and about 60 wt % of said banded pigment being colored pigment particles and between about 40 and about 80 wt % of said banded pigment being a suspension polymer formed of monomers comprising styrene or alkyl-substituted styrene and acrylic acid or alkyl-substituted acrylic acid, said support polymer having an acid number of between about 50 and about 250, the amount of banded pigment (3) being sufficient to make the total amount of pigment and/or filler in the paint at least about 60 wt %, (4) optional additional water as required to achieve a desired solids level consistent with parameters recited above, and (5) additional ammonia as required to maintain an emulsion of said emulsion binder and a suspension of said pigment particles encapsulated in said suspension polymer, said paint having an ASTM D-711 "no pick-up" time of 2 minutes or less at ambient temperatures.

16. A method of preparing a water-borne air-dry paint suitable for marking a paved surface comprising mixing (1) an emulsion of a binder in ammonia/aqueous medium, said binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and about 80 wt % of an emulsion polymer comprising esters of acrylic acid or alkyl-substituted acrylic acid, said emulsion polymer being formed of between about 20 and about 80 mole percent monomers which are acrylic esters of alcohols having 8 or more carbon atoms and between about 20 and about 80 mole percent of monomers which are acrylic esters of alcohols having 4 or fewer carbon atoms, said support polymer and said emulsion polymer being in the form of micelles with said support polymer acting as a surfactant to maintain said emulsion polymer within said micelles, (2) between about 53 and about 75 wt % colorless or white pigments and/or fillers, plus surfactant sufficient to maintain said colorless or white pigment and/or fillers dispersed, (3) between about 0.5 and about 22 wt % of banded pigment, between about 20 and about 60 wt % of said banded pigment being colored pigment particles and between about 40 and about 80 wt % of said banded pigment being a suspension polymer formed of monomers comprising styrene or alkyl-substituted styrene and acrylic acid or alkyl-substituted acrylic acid, said support polymer having an acid number of between about 50 an about 250, the amount of banded pigment (3) being sufficient to make the total amount of pigment and/or filler 60 wt %, (4) optional additional water as required to achieve a desired solids level consistent with parameters recited above, and (5) additional ammonia as required to maintain an emulsion of said emulsion binder and a suspension of said pigment particles encapsulated in said suspension polymer, said paint having an ASTM D-711 "no pick-up" time of 2 minutes or less at ambient temperatures.

17. An air-dry waterborne paint comprising (1) between about 10 and about 15 wt. percent of an emulsion binder comprising between about 20 and about 40 wt % of a support polymer formed monomers comprising styrene or substituted styrene or alkyl-substituted styrene and acrylic acid or alkyl-substituted acrylic acid, said support polymer having an acid number of between about 50 and abut 250, and an emulsion polymer formed of monomers comprising esters of acrylic acid or alkyl-substituted acrylic acid, optionally styrene or alkyl-substituted styrene and optionally an amount of acrylic acid or an alkyl-substituted acrylic acid sufficiently low so that said emulsion polymer is insoluble in alkaline aqueous solution, said support polymer and said emulsion polymer being in the form of micelles with said support polymer acting as a surfactant to maintain said emulsion polymer within said micelles, (2) between about 60 and about 75 wt. percent pigments and/or fillers, plus surfactant sufficient to maintain said pigment and/or filler dispersed, and (3) between about 9 and about 18 wt. percent water, plus sufficient ammonia to maintain an emulsion of said binder, said paint having an ASTM D711 "no pick-up" time of 2 minutes or less at ambient temperatures.

18. An air-dry waterborne paint comprising;

(1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and an emulsion polymer formed of monomers comprising esters of acrylic acid or alkyl-substituted acrylic acid, said emulsion polymer being formed of between about 20 and about 80 mole percent monomers which are acrylic esters of alcohols having 8 or more carbon atoms and between about 20 and about 80 mole percent of monomers which are acrylic esters of alcohols having 4 or fewer carbon atoms, said support polymer and said emulsion polymer being in the form of micelles with said support polymer acting as a surfactant to maintain said emulsion polymer within said micelles, (2) between about 60 and about 75 wt. percent pigments and/or fillers plus surfactant sufficient to maintain said pigment and/or filler dispersed, and (3) between about 9 and about 18 wt. percent water, plus sufficient ammonia to maintain an emulsion of said binder, said paint having an ASTM D-711 "no pick-up" time of 2 minutes or less at ambient temperatures.

19. An air-dry waterborne paint comprising (1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and about 80 wt. percent of an emulsion polymer formed of monomers comprising esters of acrylic acid or alkyl-substituted acrylic acid, optionally styrene or alkyl-substituted styrene and optionally an amount of acrylic acid or an alkyl-substituted acrylic acid sufficiently low so that said emulson polymer is insoluble in alkaline aqueous solution, said support polymer and said emulsion polymer being in the form of micelles with said support polymer acting as a surfactant to maintain said emulsion polymer within said micelles, (2) between about 53 and about 75 wt. percent colorless or white inorganic pigments and/or fillers, plus surfactant sufficient to maintain said colorless or white pigment and/or filler dispersed, and (3) between about 1½ and about 15 wt. percent of a dispersing polymer formed of monomers comprising styrene or alkyl-substituted styrene and acrylic acid or substituted acrylic acid, said support polymer having an acid number of between about 50 and about 250, (4) between about 0.2 and about 7 wt. percent of colored pigment particles encapsulated by and suspended in said dispersing polymer, the total amount of (2) plus (4) being at least about 60 wt %, and (5) between about 9 and about 18 wt. percent water, plus sufficient ammonia to maintain an emulsion of said emulsion binder and maintain said dispersing polymer encapsulated pigment particles in suspension, said paint having an ASTM D-711 "no pick-up" time of 2 minutes or less at ambient temperatures.

20. An air-dry waterborne paint comprising;

(1) between about 10 and about 15 wt. percent of an emulsion binder comprising between about 20 and about 40 wt % of a support polymer formed of monomers comprising styrene or alkyl-substituted styrene and acrylic acid or alkyl-substituted acrylic acid, said support polymer having an acid number of between about 50 and about 250, and between about 60 and about 80 wt. percent of an emulsion polymer formed of monomers comprising esters of acrylic acid or alkyl-substituted acrylic acid, said emulsion polymer being formed of between about 20 and about 80 mole percent monomers which are acrylic esters of alcohols having 8 or more carbon atoms and between about 20 and about 80 mole percent of monomers which are acrylic esters of alcohols having 4 or fewer carbon atoms, said support polymer and said emulsion polymer being in the form of micelles with said support polymer acting as a surfactant to maintain said emulsion polymer within said micelles, (2) between about 53 and about 75 wt. percent colorless or white inorganic pigments and/or fillers plus surfactant sufficient to maintain said colorless or white pigment and/or filler dispersed, and (3) between about 1½ and about 15 wt. percent of a dispersing polymer formed of monomers comprising styrene or substituted styrene and acrylic acid or alkyl-substituted acrylic acid, said support polymer having an acid number of between about 50 and about 250, (4) between about 0.2 and about 7 wt. percent of colored pigment particles encapsulated by and suspended in said dispersing polymer, the total amount of (2) plus (4) being about 60 wt. % and (5) between about 9 and about 18 wt. percent water, plus sufficient ammonia to maintain an emulsion of said emulsion binder, said paint having an ASTM D711 "no pick-up" time of 2 minutes or less at ambient temperatures.

21. A paint according to claim 17 wherein substantially none of the carboxylic groups of said support polymer are esterified to hydrophilic moieties.

22. A method according to claim 17 wherein said emulsion polymer was prepared in the substantial absence of surfactant other than said support polymer.

23. A paint according to claim 17 which further comprises between about 3 and about 6 wt. percent of an organic solvent.

24. A paint according to claim 23 wherein said organic solvent is methanol.

25. A paint according to claim 17 wherein micelles of said emulsion polymer are predominantly in the size range of about 0.2 microns or below.

26. A paint according to claim 17 wherein micelles of said emulsion polymer are predominantly in the size range of between 27. A paint according to claim 17 containing between about 0.5 and about 2.0 wt. percent of said surfactant.

28. A paint according to claim 17 containing a mixture of anionic and non-ionic surfactants.

29. A method according to claim 17 wherein said emulsion polymer has a $T_g$ of between about $-15°$ C. and about $15°$ C.

30. A paint according to claim 17 wherein said pigments and/or fillers are at a level of upward of about 68 wt. percent.

31. A paint according to claim 17 wherein between about 70 and about 90 wt. percent of said fillers and/or pigment is calcium carbonate.

32. A method according to claim 12 wherein micelles of said emulsion polymer are predominantly in the size range of about 0.2 microns or below.

33. A method according to claim 13 wherein micelles of aid emulsion polymer are predominantly in the size range of about 0.2 microns or below.

34. A method according to claim 14 wherein micelles of said emulsion polymer are predominantly in the size range of about 0.2 microns or below.

35. A method according to claim 15 wherein micelles of said emulsion polymer are predominantly in the size range of about 0.2 microns or below.

36. A method according to claim 16 wherein micelles of said emulsion polymer are predominantly in the size range of about 0.2 microns or below.

37. A paint according to claim 18 wherein micelles of said emulsion polymer are predominantly in the size range of about 0.2 microns or below.

38. A paint according to claim 19 wherein micelles of said emulsion polymer are predominantly in the size range of about 0.2 microns or below.

39. A paint according to claim 20 wherein micelles of said emulsion polymer are predominantly in the size range of about 0.2 microns or below.

* * * * *

UNITED STATES PATENT AND TRADEMARK OFFICE
CERTIFICATE OF CORRECTION

PATENT NO. : 5,340,870
DATED : August 23, 1994
INVENTOR(S) : Clinnin, et al

It is certified that error appears in the above-indentified patent and that said Letters Patent is hereby corrected as shown below:

```
Column 2, Line 23, "number as" should be --number be as--.
Column 5, Line 54, "polypher" should be --polymer--.
Column 7, Line 59, "than than" should be --than--.
Column 8, Line 39, "viscostity" should be --viscosity--.
Column 10, Line 32, --EXAMPLE 8-- should be inserted.
Column 13, Line 14, "Snowflake P.E." should be --Snowflake P.E.          --.
Column 13, Line 16, "Ammonia" should be --Ammonia              --.
Column 15, Line 39, "abut" should be --about--.
Column 16, Line 13, "90 wt %" should be --80 wt %--.
Column 17, Line 35, "abut" should be --about--.
Column 20, Line 3, "between" should be --between about 0.1 and about 0.2 microns--.
```

Signed and Sealed this

Sixth Day of December, 1994

Attest:

BRUCE LEHMAN

Attesting Officer

Commissioner of Patents and Trademarks